Patented Apr. 21, 1936

2,037,898

UNITED STATES PATENT OFFICE

2,037,898

METHOD OF MAKING DYED RUBBER PRODUCTS

Merrill E. Hansen, Akron, Ohio, assignor to American Anode Inc., Akron, Ohio, a corporation of Delaware No Drawing. Application December 29, 1932, Serial No. 649,335

13 Claims. (Cl. 18—50)

This invention relates to the manufacture of colored rubber goods and more particularly to a method of making dyed rubber products from a liquid dispersion of rubber.

Numerous shaped articles are now made by dipping a form, either with or without a coating of coagulant and/or other material, into a bath containing a liquid dispersion of rubber such as latex, withdrawing the form with an adherent layer of rubber thereon, and drying and vulcanizing the rubber.

Such articles have heretofore been colored, when desired, in one of several manners, each of which presents certain inherent disadvantages and undesirable features. Dyes or other coloring materials usually have been added directly to the dispersion from which the articles are made, which method obviously necessitates the preparation and use of a different dispersion of rubber for each color desired, entailing considerable expense and inconvenience and forcing manufacturers to carry large and often burdensome stocks of prepared rubber dispersions when making articles of several colors. Furthermore, it is frequently difficult and undesirable to add certain types of coloring materials directly to a rubber dispersion because such practice may result in premature or partial coagulation of the relatively unstable dispersion or may lead to other similar difficulties.

An object of the present invention is to provide economically for the production of uniformly dyed rubber products from rubber dispersions. A further object of the invention is to provide a method of making such products which will not involve the undesirable features of prior processes hereinabove described. Other objects will appear from the following description of the invention.

Briefly, the method of the present invention comprises providing a form with a coating containing a dye or like coloring material, then associating with the coated form a liquid dispersion of rubber, causing a layer of rubber to be deposited upon the form from the rubber dispersion, and maintaining the layer of wet rubber in contact with the dye-containing coating until a quantity of the dye shall have diffused into the freshly deposited rubber layer, and thereafter drying and vulcanizing the dyed rubber article.

The layer of rubber may be deposited upon the form at a single application of the rubber dispersion, or the application may be repeated several times, either with or without intermediate coagulant treatments.

It will appear from the above brief description that in the present method the dye is in contact with and is introduced into the rubber layer from the moment deposition of rubber on the form is initiated, and that diffusion of the dye into the rubber begins at that time and continues during the deposition process while the rubber layer is in the highly porous condition characteristic of freshly deposited rubber. Since diffusion of the dye is caused to occur under these most favorable conditions, the impregnation and penetration of the dye into the rubber is extremely uniform and highly satisfactory.

The dye-containing coating of this invention may be applied to the form in a number of ways, but this is preferably accomplished by applying to the form a film of a liquid vehicle containing the dye and thereafter removing at least a part of the vehicle to produce a substantially non-flowing viscous dye-containing coating on the form.

The dye selected, which may be any of the commercial dyes suitable for such use, such as methyl violet, rhodamine, soudan dyes, malachite green etc., is preferably dissolved in a volatile organic solvent such as an alcohol, a ketone, or an ester, although water or other liquid may be used. The dye solution may also contain, although this is not essential to the invention hereof, a coagulant such as formic, acetic, or other acid, or a salt of a polyvalent metal such as zinc nitrate, calcium chloride, etc., and/or an ingredient such as mica, graphite, diatomaceous earth, soapstone, etc. capable of preventing adherence of the deposited rubber to the form, so that a single immersion of the form in the dye solution may serve to coat the form with a layer containing the dye and also where desired, a coagulant and/or other material.

The concentration of dye in the liquid may vary from about 0.5% by weight up to the limit of its solubility in the particular solvent used, the exact concentration in a given case depending upon the properties of the dye and upon the intensity of color desired in the finished product.

In a specific example of the manner of carrying out the present invention, a shaped form, which may be made of porcelain, metal, glass, bakelite, rubber or like material, is immersed in a dye solution containing 30 parts by weight of methyl violet dye and 200 parts of commercial calcium nitrate dissolved in one liter of methanol. The form is withdrawn from the dye-containing liquid, inverted, and dried for a time sufficient to allow evaporation of at least a part of the methanol and to form a viscous non-flowing coating containing the dye and the coagulant on the form. The form thus coated is then immersed in an aqueous dispersion of rubber for a time, usually one to ten minutes, sufficient to allow a rubber layer of a desired thickness to be deposited upon the form in the course of which the dye will diffuse from the dye-containing coating into and throughout the forming rubber deposit. The form and associated rubber layer are removed from the dispersion, inverted, and usually allowed to stand for a short time, for example about five to ten minutes, to allow diffusion of the dye into the rubber to continue and to allow the rubber deposit to become set. Thereafter, the rubber is washed, dried, and vulcanized in the customary manner, either while remaining on the form or after removal therefrom. If the washing, drying, and vulcanizing operations are performed while the rubber is still on the form diffusion of the dye into the rubber will continue while the rubber is in contact with the dye-coated form until the rubber is dried, and if a rubber soluble dye be used, migration of the dye will continue even after the drying operation.

If desired, the dye-containing coating may be applied to a portion only of the form, or coatings containing different colored dyes may be applied to various parts of the form to produce a vari-colored article. Other variations of like nature are possible.

Through the practice of the present method wherein the dye is introduced into the rubber layer while the latter is in the process of formation and in its most porous condition, superior and highly satisfactory dye penetration and distribution is obtained throughout the body of the rubber even when using rubber insoluble dyes. Further, when using the so-called coagulant dip process no additional manufacturing step is necessary since the dye may be applied to the form by means of the coagulant solution already generally used in the process.

Rubber articles of different colors may be produced from a single neutral colored rubber dispersion, such as is natural latex, thus eliminating the necessity of carrying large stocks of many different colored rubber dispersions by a manufacturer making articles of different colors. Other advantages will be apparent to those familiar with the art.

The term "rubber" has been herein used in a generic sense to include caoutchouc, balata, gutta percha, and similar natural or synthetic gums, whether in the unvulcanized, vulcanized, or reclaimed condition. Likewise, the term "liquid dispersion of rubber" includes flowable liquids made by dispersing rubber as hereinabove defined in a liquid vehicle, either with or without the aid of dispersing and/or stabilizing agents, as well as latices of rubber producing plants either in a natural condition or modified by dilution, concentration, and/or by the addition of thickening, thinning or other modifying materials. The liquid dispersions should preferably contain fillers, vulcanizing agents, accelerators, age-resisters or other compounding ingredients commonly used in rubber compositions.

Numerous variations and modifications may be made in the preferred procedures and compositions which have been set forth hereinabove in describing the present invention, and it is not the intent to limit the discovery thereby, or otherwise, except as may be required by the prior art and as indicated in the appended claims.

I claim:

1. The method of making dyed rubber products which comprises applying to a form a coating containing a substantially non-coagulating dye and a coagulant and associating with the coated form a coagulable dispersion of rubber, maintaining the resulting deposited layer of rubber in contact with the form for a time sufficient to allow a quantity of the dye to diffuse into the wet rubber layer, and thereafter drying the rubber.

2. The method of making dyed rubber products which comprises applying to a form a coating containing a substantially non-coagulating dye and an adhesion-preventing material and associating the coated form with a dispersion of rubber to deposit upon the form a layer of rubber, maintaining the rubber layer in contact with the coated form for a time sufficient to allow a quantity of the dye to diffuse into the rubber layer from the coated form and then drying the rubber.

3. The method of making dyed rubber products which comprises applying to a form a coating containing a substantially non-coagulating dye, a coagulant, and an adhesion-preventing material, associating with the coated form a coagulable dispersion of rubber, and maintaining the resulting coagulated layer of rubber in contact with the coated form for a time sufficient to allow a quantity of the dye to diffuse into the rubber layer from the coated form, and then drying the rubber.

4. The method of making dyed rubber products which comprises applying to a form a fluid mixture containing a substantially non-coagulating dye and a coagulant in a liquid vehicle, removing the liquid vehicle at least in part to form a substantially non-flowing dye- and coagulant-containing coating on the form and associating the coated form with a coagulable dispersion of rubber to deposit upon the form a layer of rubber, maintaining the rubber layer in contact with the coated form for a time sufficient to allow a quantity of the dye to diffuse into the rubber layer from the coated form, and thereafter drying the rubber.

5. The method of making dyed rubber products which comprises applying to a form a fluid mixture containing a substantially non-coagulating dye and an adhesion-preventing material in a liquid vehicle, removing the liquid vehicle at least in part to form a substantially non-flowing dye-containing coating on the form and associating the coated form with a dispersion of rubber, to deposit upon the form a layer of rubber maintaining the rubber layer in contact with the coated form for a time sufficient to allow a quantity of the dye to diffuse into the rubber layer, and thereafter drying the rubber.

6. The method of making dyed rubber products which comprises applying to a form a fluid mixture containing a substantially non-coagulating dye, a coagulant, and an adhesion-preventing material in a volatile organic solvent, evaporating at least a part of the solvent to form a substantially non-flowing dye- and coagulant-containing coating on the form, and associating the coated form with a coagulable dispersion of rubber to deposit upon the form a layer of rubber, maintaining the rubber layer in contact with the dye-coated form for a time sufficient to allow a quantity of the dye to diffuse into the rubber layer, and thereafter drying and vulcanizing the rubber.

7. The method of making vari-colored rubber products which comprises applying to a form a coating containing a plurality of substantially non-coagulating dyes of different colors, and associating the coated form with a dispersion of rubber to deposit upon the form a layer of rubber, maintaining the rubber layer and the form in contact for a time sufficient to allow a quantity of the dyes to diffuse into the rubber layer from the coated form, and thereafter drying the rubber.

8. A method which comprises applying to a form a coating containing an organic dye, applying to the dye-coated form an aqueous dispersion of rubber to deposit upon the form a layer of rubber, permitting a quantity of the dye adequate to effect the desired coloring to diffuse from the coating upon the form into the rubber, and drying the colored rubber.

9. A method as defined by claim 8 in which the dye is a basic organic dye.

10. A method which comprises applying to a form a fluid composition containing an organic dye in a liquid vehicle, removing the liquid vehicle at least in part to produce a substantially non-flowing dye-containing coating on the form, applying to the dye-coated form an aqueous dispersion of rubber to deposit thereon a layer of rubber, permitting a quantity of the dye adequate to effect the desired coloring to diffuse from the coating upon the form into the rubber, and drying the colored rubber.

11. A method as defined by claim 10 in which the dye is a basic organic dye.

12. A method which comprises applying to a form a coating containing an organic dye and a coagulant for an aqueous dispersion of rubber, associating the coated form with a coagulable aqueous dispersion of rubber to deposit upon the form a layer of rubber, permitting a substantial quantity of the dye to diffuse from the coating upon the form into the rubber, and drying the colored rubber.

13. A method which comprises coating a form at least in part with a fluid composition containing a liquid vehicle, an organic dye, and a coagulant for an aqueous dispersion of rubber, associating the coated form with a coagulable aqueous dispersion of rubber to deposit upon the form a layer of rubber, permitting a substantial quantity of the dye to diffuse from the coating upon the form into the rubber, and drying the colored rubber.

MERRILL E. HANSEN.